Sept. 21, 1965   M. GORISSEN ETAL   3,207,142
INTERNAL COMBUSTION ENGINE AND TRANSMISSION ASSEMBLIES
Filed Feb. 12, 1964
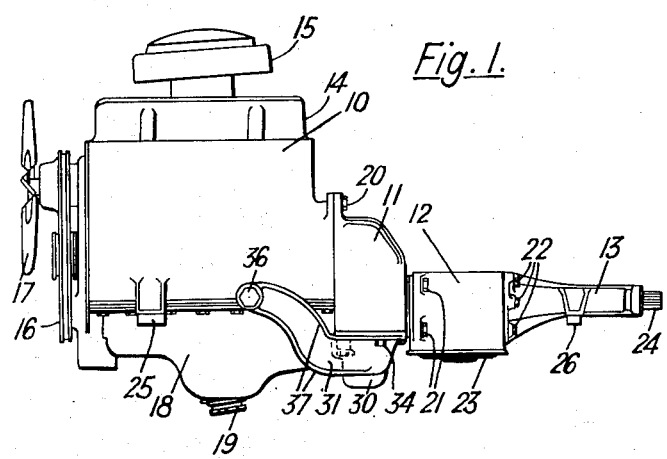
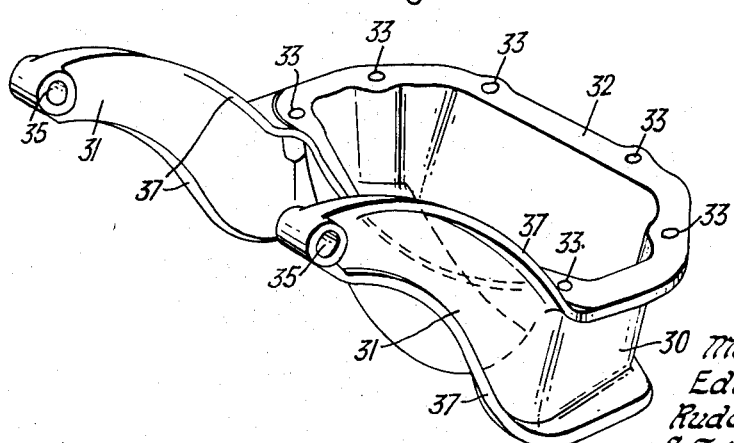
INVENTORS
Max Gorissen,
Edwin Kiefer,
Rudolf Helfmann,
& Friedrich Burhop
BY
Attorney

United States Patent Office 3,207,142
Patented Sept. 21, 1965

3,207,142
INTERNAL COMBUSTION ENGINE AND TRANSMISSION ASSEMBLIES
Max Gorissen, Horlach, Wald, Russelsheim (Main), Edwin Kiefer, Russelsheim (Main), Rudolf Helfmann, Langen, Hessen, and Friedrich Burhop, Russelsheim (Main), Germany, assignors to General Motors Corporation, Detroit, Mich., a corporation of Delaware
Filed Feb. 12, 1964, Ser. No. 344,369
Claims priority, application Germany, Feb. 14, 1963, O 9,238
3 Claims. (Cl. 123—195)

This invention relates to internal combustion engine and transmission assemblies and in particular to internal combustion engine and transmission assemblies employed in motor road vehicles. Such assemblies commonly comprise an engine, a clutch and a gear box, the engine having the clutch housing bolted thereto and the gear box being bolted on to the clutch housing.

In an internal combustion engine and transmission assembly according to the present invention the clutch housing has a bottom plate member which is secured thereto and which has a pair of arms which are secured to each side of the engine block. Said plate member may constitute a bottom closure member for the clutch housing.

Such an arrangement increases the rigidity of the engine and transmission assembly and reduces the tendency of such assemblies to flex about the connection between the engine and clutch housing.

The scope of the invention is defined by the following claims; and the invention and the method by which it is to be performed are hereinafter particularly described with reference to the accompanying drawings in which:

FIGURE 1 is a side elevation of an internal combustion engine and transmission assembly according to the invention; and FIGURE 2 is a perspective view to a larger scale of a bottom plate member for the clutch housing shown in FIGURE 1.

The assembly shown in FIGURE 1 comprises an engine 10, a clutch housing 11, and a gear box 12 having a terminal transmission portion 13. The engine 10 has a cylinder head cover 14, and an air filter 15. A drive belt 16 provides drive from the engine to a cooling fan 17. The engine 10 has a sump 18 with an oil drainage plug 19 therein.

The clutch housing 11 and engine 10 are bolted together at 20; the gear box 12 is bolted to the clutch housing 11 at 21; and the terminal transmission portion 13 is bolted to the gear box 12 at 22. A sheet metal cover 23 forms the bottom closure for the gear box 12 which has an output shaft 24.

The assembly is mounted on a frame or vehicle body (not shown) by means of two rubber pads 25 one on each side of the engine 10, and a third pad 26 on the terminal transmission portion 13.

The bottom closure for the clutch housing 11 is formed by a pan or cradle 30 having two arms 31, one on each side of the pan, which extend obliquely upwards and forwards. The pan 30 has, on its upper edge, a flange 32 which is bolted to the clutch housing 11 at points 33 by bolts 34 (FIGURE 1).

The front ends of arms 31 are formed with eyes 35 through which bolts are passed and are secured to the engine 10, as shown at 36 in FIGURE 1. The stiffness of the arms 31 is increased by the provision of upper and lower flanges 37 thereon.

The pan 30 and its arms 31 may be made as a one piece casting of light metal or grey cast iron; alternatively, the pan 30 and its arms 31 may be constructed by welding together sheet metal components.

We claim:

1. A composite internal combustion engine and drive assembly comprising an engine having rigidly secured thereto at one end thereof a drive assembly including a clutch housing, a pair of spaced supports, one on said engine and the other on said drive assembly, adapted to support said composite assembly at two spaced points, a stiffener member tying said composite assembly into a rigid unit secured to the bottom of said clutch housing constituting a bottom closure member therefor and having integral therewith a pair of substantially horizontally extending arms embracing opposite sides of said engine and secured thereto by a pair of axially aligned, horizontally disposed fastening members, whereby said member stiffens the connection between said engine and said clutch housing and thereby tends to reduce bending of said composite assembly when supported on said supports and flexural vibrations occurring in said composite assembly during operation of the engine.

2. In an internal combustion engine and clutch assembly, the combination of an engine, a clutch housing rigidly secured at one end of said engine, said clutch housing having an opening in the bottom thereof, a hinged bottom closure member formed as a pan and having two arms integral therewith which extend substantially horizontally forward and are pivotally attached by a pair of axially aligned, horizontally disposed fastening members to opposite sides of the engine, said arms serving as the hinges by which the closure member can be lowered away from the underside of the clutch housing, and means to secure said bottom closure member to said clutch housing.

3. A composite internal combustion engine and drive assembly comprising an engine, a drive assembly rigidly secured to said engine at one end thereof including a clutch assembly having an opening in the bottom thereof, a pair of spaced supports, one on said engine and the other on said drive assembly, adapted to support said composite assembly at two spaced points, a stiffener member tying said composite assembly into a rigid unit and comprising a pan-shaped bottom closure member for the clutch assembly having two arms integral therewith which project substantially horizontally forward and are pivotally attached by a pair of axially aligned, horizontally disposed fastening members to the sides of said engine, and means to secure the bottom closure member to the clutch housing to close the opening in the bottom thereof, whereby said stiffener member stiffens the connection between said engine and said drive assembly to reduce bending of the composite assembly when supported on said supports and flexural vibration occurring in the composite assembly during operation of the engine and the integral arms thereon serve as a means by which the said bottom closure member can be lowered away from the underside of the clutch housing.

(References on following page)

References Cited by the Examiner

UNITED STATES PATENTS 2,369,292  2/45  Friedman _____ 192—115

OTHER REFERENCES

"Automotive Engines" (Frazee, Bedell and Venk), publ. by American Technical Society (Chicago, U.S.A.), 1951, page 73 relied on.

"Automotive Power Transmission Units," TM 10-585, published by the War Dept., Wash., D.C., U.S.A., 1941 page 14 relied on.

"1962 Ford Galaxie Shop Manual," published by the Ford Division of Ford Motor Company (U.S.A.), 1961, page 5-2 relied on.

FRED E. ENGELTHALER, *Primary Examiner*.
RICHARD B. WILKINSON, *Examiner*.